(12) United States Patent
Yoshida et al.

(10) Patent No.: US 7,593,046 B2
(45) Date of Patent: Sep. 22, 2009

(54) COLOR IMAGE PICKUP APPARATUS HAVING RANDOM COLOR CODING ARRAY

(75) Inventors: Hideaki Yoshida, Hachioji (JP); Hatsuo Shimizu, Hachioji (JP)

(73) Assignee: Olympus Corporation, Tokyo (JP)

( * ) Notice: Subject to any disclaimer, the term of this patent is extended or adjusted under 35 U.S.C. 154(b) by 435 days.

(21) Appl. No.: 11/519,823

(22) Filed: Sep. 13, 2006

(65) Prior Publication Data

US 2007/0019086 A1    Jan. 25, 2007

Related U.S. Application Data

(62) Division of application No. 09/551,143, filed on Apr. 14, 2000, now Pat. No. 7,123,299.

(30) Foreign Application Priority Data

| Apr. 15, 1999 | (JP) | ................................. | 11-107371 |
| Apr. 15, 1999 | (JP) | ................................. | 11-107372 |
| Apr. 15, 1999 | (JP) | ................................. | 11-107440 |
| May 6, 1999 | (JP) | ................................. | 11-125494 |

(51) Int. Cl.
*H04N 9/64* (2006.01)
*H04N 9/083* (2006.01)
*H04N 3/14* (2006.01)
*H04N 5/335* (2006.01)
*H04N 9/04* (2006.01)

(52) U.S. Cl. ...................... 348/246; 348/272; 348/273
(58) Field of Classification Search ......... 348/246–247, 348/266, 272–274
See application file for complete search history.

(56) References Cited

U.S. PATENT DOCUMENTS

| 4,574,311 | A | 3/1986 | Resnikoff et al. |
| 5,852,454 | A | 12/1998 | Kanematsu et al. |
| 6,115,064 | A | 9/2000 | Mogi |
| 6,157,406 | A | 12/2000 | Iura et al. |
| 6,188,804 | B1 | 2/2001 | Weldy et al. |
| 6,343,146 | B1 | 1/2002 | Tsuruoka et al. |
| 6,577,341 | B1 | 6/2003 | Yamada et al. |
| 6,618,084 | B1 | 9/2003 | Rambaldi et al. |
| 6,642,960 | B1 * | 11/2003 | Kohashi et al. ............. 348/246 |
| 6,683,643 | B1 * | 1/2004 | Takayama et al. ........... 348/247 |
| 6,803,955 | B1 | 10/2004 | Yoshida |

FOREIGN PATENT DOCUMENTS

JP          09-168157        6/1997

* cited by examiner

*Primary Examiner*—Kelly L Jerabek
(74) *Attorney, Agent, or Firm*—Westerman, Hattori, Daniels & Adrian, LLP.

(57) ABSTRACT

A color image pickup device including: a pixel group placed in an array of a plurality of pixels of photoelectric conversion elements; and a color coding array corresponding to the pixel group, the color coding array arranged in a randomized array, or arranged in a randomized array satisfying predetermined array restricting conditions, or arranged in a randomized array satisfying predetermined color distributing conditions. Thereby an object image can be picked up in accordance with a randomized color coding array having no regularity, making it possible without using an optical low-pass filter to achieve a color image pickup device and color image pickup apparatus using the color image pickup device capable of keeping color moire from occurring even of an object having a cyclic luminance change.

5 Claims, 5 Drawing Sheets

FIG. 1A    PRIOR ART

| G | B |
|---|---|
| R | G |

FIG. 1B    PRIOR ART

| G | B | G | B | G | B | G | B |
|---|---|---|---|---|---|---|---|
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |

| R | B | G | R | R | B | G | B |
|---|---|---|---|---|---|---|---|
| G | G | R | B | G | R | B | R |
| B | G | B | G | G | B | B | G |
| R | B | B | G | R | R | G | B |
| G | G | R | R | B | R | G | R |
| R | B | G | G | G | R | B | B |
| R | B | G | B | R | B | B | G |
| G | B | R | B | G | G | R | B |

FIG. 4

| G | R | R | G | R | B | G | R |
|---|---|---|---|---|---|---|---|
| B | B | B | G | B | G | G | B |
| R | G | G | R | B | B | R | G |
| B | B | G | R | G | G | B | R |
| G | R | G | B | R | G | G | R |
| G | B | R | R | R | B | R | B |
| R | B | B | G | G | B | B | G |
| B | G | B | R | B | G | R | B |

FIG. 5

| G | R | B | B | B | G | R | R |
|---|---|---|---|---|---|---|---|
| G | R | R | G | B | G | R | B |
| B | R | G | R | B | G | G | G |
| B | G | R | B | R | R | R | G |
| B | R | B | G | B | B | G | R |
| B | R | B | R | G | B | R | B |
| G | G | B | G | R | B | R | G |
| G | G | G | R | G | R | R | B |

FIG. 6

| G | R | B | B | G | G | R | R |
|---|---|---|---|---|---|---|---|
| G | R | G | G | B | G | R | B |
| B | R | G | R | B | G | G | G |
| B | G | G | B | G | G | R | G |
| B | G | G | G | B | G | G | R |
| G | G | B | R | G | B | R | B |
| G | G | B | G | R | B | R | G |
| G | G | G | G | G | R | R | B |

FIG. 7

| R | B | G | R | R | B | G | B |
|---|---|---|---|---|---|---|---|
| G | G | R | B | B | R | R | R |
| B | G | R | G | G | G | B | G |
| R | B | B | G | R | R | G | B |
| G | G | R | R | B | B | G | R |
| R | B | G | G | G | R | B | B |
| R | B | G | B | R | B | B | G |
| G | B | R | B | G | G | R | B |

COLOR IMAGE PICKUP APPARATUS HAVING RANDOM COLOR CODING ARRAY

RELATED APPLICATION

This application is a divisional of U.S. patent application Ser. No. 09/551,143 filed on Apr. 14, 2000, which claims benefits of Japanese Patent Applications No. Rei 11-107371, No. Rei 11-107372 and No. Rei 11-107440 filed in Japan on Apr. 15, 1999, and No. Rei 11-125494 filed in Japan May 6, 1999, the contents of which are incorporated by reference in its entirety. Priority under 35 U.S.C. 120 and 121 is also hereby claimed for benefit of the filing date of U.S. patent application Ser. No. 09/551,143.

BACKGROUND OF THE INVENTION

The present invention relates to a color image pickup device capable of preventing color moire from occurring and relates to color image pickup apparatus using such color image pickup device.

The image pickup devices typically represented by image pickup tube and solid-state image pickup device are widely used in image pickup apparatus. Especially, those color image pickup devices used in single-tube or single-sensor color image pickup apparatus, because of their capability of constructing a color image pickup apparatus by a single image pickup device, greatly facilitates downsizing/power saving of the color image pickup apparatus, since they are characterized in that: a color separation prism is not required and a reduction in size of lens is possible; various adjustments in a multiple-sensor system such as registration are not required; and dissipation power is smaller. In particular, a majority of image pickup apparatus are manufactured as a single-sensor color camera using color CCD image pickup device which is among the solid-state image pickup devices.

In order to obtain color information by a single light-receiving surface, the above described color image pickup devices, without exception, are to perform color modulation (color coding) within the light-receiving surface by using a color filter such as the so-called stripe filter or mosaic filter. For example, a different spectral sensitivity is imparted to each of the pixels by putting filters of the three colors of RGB on the respective photoelectric conversion elements (pixels) in a predetermined, regular order of arrangement. The image signals obtained from an imaging of object thus contain a point-by-point, sequential color information according to such filter array, and the color information can be read out by extracting separated signals by means of separation by each signal corresponding to each filter in accordance with the above described array. Since all pieces of information of RGB are necessary to obtain a luminance signal (Y signal), at least 3 pixels (one each for RGB) are necessary to obtain the luminance information of one pixel. Hence an image can be picked up in colors by using a single image pickup device even though luminance resolution is somewhat sacrificed.

The various types of color coding patterns having been proposed/used as the above described filter array of color filters include: such filter arrays of three primary colors as RGB stripe, Bayer-type RGB mosaic (various types); and such complementary-color filter arrays as YeMgCy stripe, YeMgCyW 4-color mosaic, YeMgCyG 4-color mosaic.

The present invention aims at pointing out and hence providing a remedy for an essential problem which is inherent to the above described color image pickup device irrespective of its electrical construction (whether it comprises an image pickup tube or a solid-state image pickup device, whether it is of the CCD type or other types, etc.) and/or the kind of color coding (whether it uses primary colors or complementary colors, whether it uses three colors or four colors, etc.). For this reason, the following description will be explained by way of an example only, unless otherwise specified.

Figure 1A:
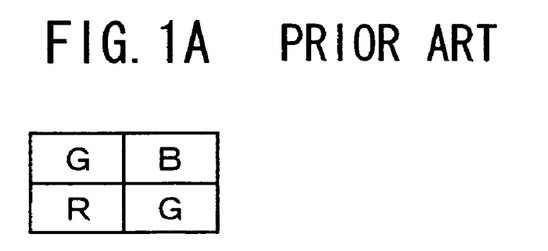
FIG. 1A and 1B show an example of a basic array and the entire array of color filter arranged in a conventional RGB Bayer array.
Figure 1B:
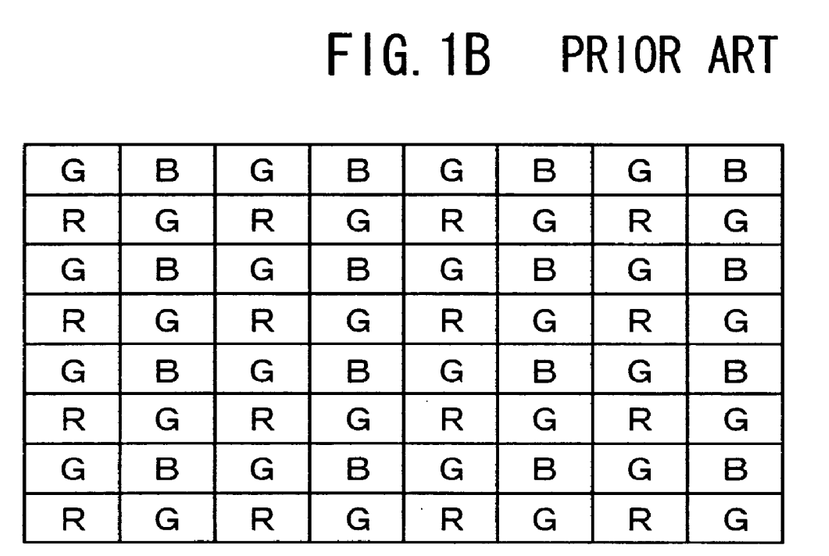

Of the above described known color coding arrays, an example of RGB Bayer array will now be described by way of FIGS. 1A and 1B. The RGB Bayer array contains a basic array consisting of 2×2 or 4 pixels as shown in FIG. 1A. Such basic arrays are sequentially arranged so as to fill a plane as shown in FIG. 1B. This is characterized in that an allocating ratio of pixels respectively for RGB of 1:2:1 is used so that the luminance resolution be enhanced by increasing the density of G which has a greater contribution to luminance signal. Further, since the same order of arrangement is used along the two directions of vertical and horizontal, it is possible, unlike a stripe type filter, to obtain an isotropic resolution. It should be noted that FIG. 1B shows an example of arbitrarily selected, 8×8=64 pixels.

Since, however, the above RGB Bayer array uses a regular order of arrangement in the manner as described above, there has been a great disadvantage that it involves the so-called color moire, a spurious resolution due to the spatial sampling according to such arrangement. In particular, suppose that a black-and-white object originally having no-hue contains a cyclic object where luminance change (black-and-white pattern) occurs at the same cycle as the cycle in the above Bayer array. For example, when a row consisting of RG is noticed and considered as one horizontal line, suppose that the object is white at R filters and black at G filters. Since signals to be outputted are equivalent to the signals obtained from a red object without having luminance change, this results in an outputting of hue which originally does not exist. Such false color signal resulting from a pattern consisting of a stripe-like repetition, i.e., color moire occurs in a low-frequency region due to the so-called frequency folding (aliasing) and hence cannot be removed even by an electrical filtering or the like including a color band suppression to be performed at a later stage.

For this reason, the conventional single-sensor color image pickup apparatus necessitates an optical low-pass filter such as of crystal in its optical system in order to secure image quality. This greatly impedes downsizing and/or cost saving. In addition, a lowered image quality due to yet remaining color moire has not been able to be avoided.

SUMMARY OF THE INVENTION

To essentially solve the problem involved in the above described cyclic color coding array of color image pickup device in the conventional color image pickup apparatus, it is an object of the present invention to provide a color image pickup device in which it is possible to keep color moire from occurring even of an object having a cyclic luminance change without using an optical low-pass filter.

In accordance with a first aspect of the invention, a color image pickup device includes: a pixel group placed in an array of a plurality of pixels of photoelectric conversion elements; and a color coding array corresponding to the pixel group, arranged in a randomized array.

It is possible with a color image pickup device of such construction to pick up an object image according to the random color coding array having no regularity and hence to pick up a color image free from color moire even of an object having a cyclic luminance change without using an optical low-pass filter. The above object is thereby accomplished.

It is another object of the present invention to provide a color image pickup apparatus capable of securely performing color separation based on color coding information of a color image pickup device which keeps color moire from occurring.

In a second aspect of the invention, a color image pickup apparatus includes: a color image pickup device having a pixel group placed in an array of a plurality of pixels of photoelectric conversion elements and a color coding array corresponding to the pixel group, arranged in a randomized array; and color separation means for performing color separation processing of output signals of the color image pickup device based on the random color coding array of the color image pickup device.

With a color image pickup apparatus of such construction, an imaging free from color moire is possible without using an optical low-pass filter and at the same time color separation can be performed as based on the color coding array information of the color image pickup device. The above object is thereby accomplished.

The color image pickup apparatus according to the above second aspect preferably includes storage means for storing array data concerning the random color coding array of the color image pickup device, for performing color separation processing at the color separation means. By thus providing the storage means for storing the color coding array data of the color image pickup device, color separation based on the random color coding array information can be performed easily and securely.

Further, the storage means of the color image pickup apparatus according to the second aspect is preferably constituted by mask ROM. By thus using mask ROM as the means for storing color coding array data, the storage means and hence the color image pickup apparatus can be manufactured in large quantities at relatively low costs.

Further, the storage means of the color image pickup apparatus according to the above second aspect is preferably constituted by EEPROM. By thus using EEPROM as the means for storing color coding array data, it is possible to readily correspond to color separation processing of a color image pickup device having a different color coding array.

It is a further object of the present invention to provide a color image pickup device capable of picking up a color image where image quality performance such as a predetermined resolution is secured free from color moire without using an optical low-pass filter.

In a third aspect of the invention, a color image pickup device includes: a pixel group placed in an array of a plurality of pixels of photoelectric conversion elements; and a color coding array corresponding to the pixel group, arrayed in a randomized array satisfying predetermined array restricting conditions.

It is possible with a color image pickup device of such construction to pick up an object image according to a random color coding array having no regularity. At the same time, since the random array satisfies predetermined array restricting conditions, a color imaging is possible with securing a predetermined image quality performance (such as resolution) free from color moire. The above object is thereby accomplished.

Further, in a fourth aspect of the invention, a color image pickup device includes: a pixel group placed in an array of a plurality of pixels of photoelectric conversion elements; and a color coding array corresponding to the pixel group, arrayed in a randomized array satisfying predetermined color distributing conditions.

It is possible with a color image pickup device of such construction to pick up an object image according to a random color coding array having no regularity. At the same time, since the random array satisfies predetermined color distributing conditions, a color imaging is possible with securing a predetermined image quality performance (such as resolution) free from color moire. The above object is thus accomplished also by the color image pickup device according to the fourth aspect.

Here, the above array restricting conditions in the color image pickup device according to the third aspect are preferably minimum density conditions concerning colors. By imparting such array restricting conditions, a resolution equal to or better than a predetermined value can be maintained over the entire image pickup region.

It is a further object of the present invention to provide a color image pickup apparatus capable of securely performing color separation as based on color coding array information of a color image pickup device which keeps color moire from occurring and has a predetermined image quality performance.

In a fifth aspect of the invention, a color image pickup apparatus includes: a color image pickup device having a pixel group placed in an array of a plurality of pixels of photoelectric conversion elements and a color coding array corresponding to the pixel group, arrayed in a randomized array satisfying predetermined array restricting conditions; and color separation means for performing color separation processing of output signals of the color image pickup device in accordance with the random color coding array of the color image pickup device.

With a color image pickup apparatus of such construction, it is possible without using an optical low-pass filter to pick up an image with keeping color moire from occurring and with securing a predetermined image quality performance, and at the same time color separation can be securely performed as based on the color coding array information of the color image pickup device. The above object is thereby accomplished.

In a sixth aspect of the invention, a color image pickup apparatus includes: a color image pickup device having a pixel group placed in an array of a plurality of pixels of photoelectric conversion elements and a color coding array corresponding to the pixel group, arrayed in a randomized array satisfying predetermined color distributing conditions; and color separation means for performing color separation processing of output signals of the color image pickup device in accordance with the random color coding array of the color image pickup device.

With a color image pickup apparatus of such construction, it is possible without using an optical low-pass filter to pick up an image with keeping color moire from occurring and with securing a predetermined image quality performance, and at the same time color separation can be securely performed as based on the color coding array information of the color image pickup device. The above object is thus accomplished also by the color image pickup apparatus according to the sixth aspect.

The color image pickup apparatus according to the above fifth or sixth aspect preferably includes storage means for storing array data concerning the random color coding array of the color image pickup device, for performing color separation processing at the color separation means. By thus providing the storage means for storing the color coding array data of the color image pickup device, color separation based on the random color coding array information can be performed easily and securely.

Further, the storage means of the color image pickup apparatus according to the above fifth or sixth aspect is preferably constituted by mask ROM. By thus using mask ROM as the means for storing color coding array data, the storage means and hence the color image pickup apparatus can be manufactured in large quantities at relatively low costs.

Furthermore, the storage means of the color image pickup apparatus according to the above fifth or sixth aspect is preferably constituted by EEPROM. By thus using EEPROM as the means for storing color coding array data, it is possible to readily correspond to color separation processing of a color image pickup device having a different color coding array.

It is a further object of the invention to provide a color image pickup apparatus having a relatively small size and manufactured at low costs in which a high quality color imaging is possible with keeping color moire from occurring even of an object having a cyclic luminance change and at the same time a favorable image with compensating fault pixels can be obtained even when pixel defects occur in the image pickup device.

In a seventh aspect of the invention, a color image pickup apparatus includes: a color image pickup device having a pixel group placed in an array of a plurality of pixels of photoelectric conversion elements and a color coding array corresponding to the pixel group, arranged in a randomized array; storage means for storing array data concerning the color coding array and pixel defect data of the color image pickup device; and color separation means for generating color signals in accordance with the color coding array data stored in the storage means, said color separation means performing a predetermined pixel defect correction in the color signal generating process based on the pixel defect data stored in the storage means.

With the color image pickup apparatus having such construction, since an object image is picked up by using a color image pickup device having a randomized color coding array without cyclicity and color signals are generated based on the color coding array data, a high quality color imaging free from color moire is possible even of an object having a cyclic luminance change. Further, since pixel defect correction is performed at the same time in the color signal generating process by the color separation means based on the pixel defect data of the color image pickup device, a favorable image with compensating fault pixels can be obtained even when pixel defects exist in the color image pickup device. The above object is thereby accomplished.

Here, the predetermined pixel defect correction processing by the color separation means in the color image pickup apparatus according to the seventh aspect is preferably performed such that an output signal of the pixel nearest to the fault pixel among the pixels of the same color as the color of signal to be supplemented for the fault pixel is used to supplement an output signal of the fault pixel. By such construction, use of the color image pickup device especially which satisfying a predetermined color coding array restricting conditions makes it in effect possible to keep a degradation in resolution from occurring even if an isolated pixel defect exists.

Further, the storage means of the color image pickup apparatus according to the seventh aspect is preferably constituted by EEPROM. By such construction, it becomes possible to readily correspond to color separation or pixel defect correction processing of a color image pickup device which is different in color coding array or in the manner of pixel defects.

DESCRIPTION OF THE PREFERRED EMBODIMENT

Figure 2:
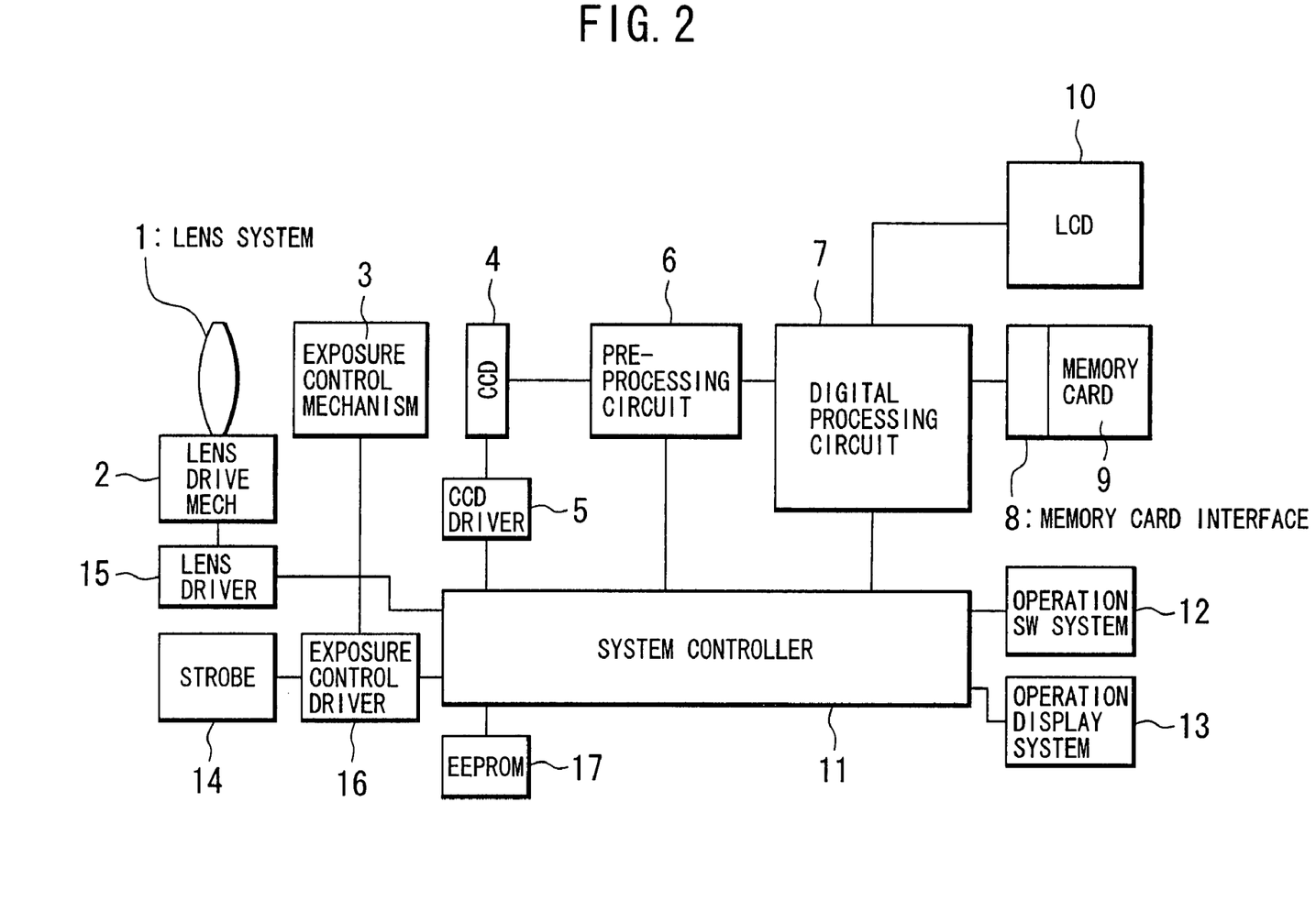
FIG. 2 is a block diagram showing a first embodiment of color image pickup apparatus using the color image pickup device according to the invention.

Some embodiments of the invention will now be described. FIG. 2 is a block diagram showing a digital camera according to a first embodiment of the color image pickup apparatus using a color image pickup device of the present invention. FIG. 2 includes: a lens system 1; a lens drive mechanism 2; an exposure control mechanism 3; a CCD image pickup device 4 having color filters arranged in a randomized array; a CCD driver 5; a preprocessing circuit 6 including an analog-to-digital converter; and a digital processing circuit 7 including memory as a hardware, for performing all the digital processing. It further includes: a memory card interface 8; a memory card 9; an LCD image display system 10; a system controller 11 including microcomputer as the main component thereof; an operation switch system 12; an operation display system 13; a strobe 14; a lens driver 15; an exposure control driver 16; and an EEPROM 17.

Figure 3:
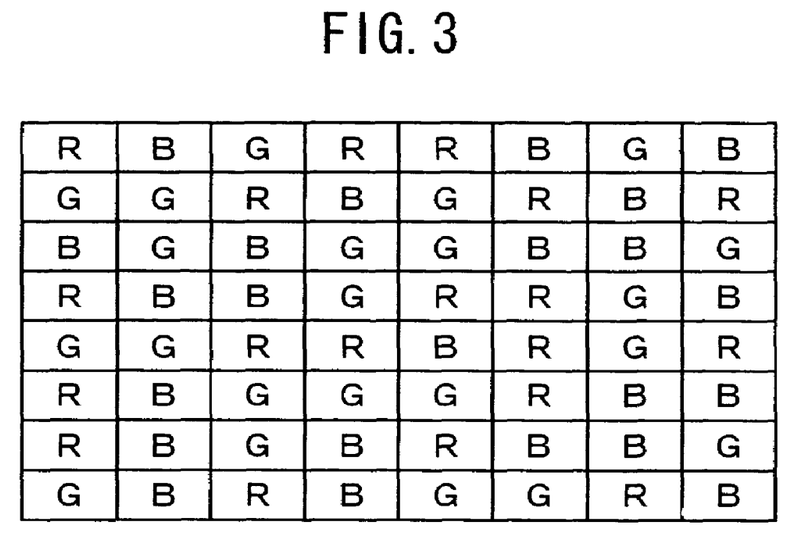
FIG. 3 shows an example of color filter of a random color coding array of CCD image pickup device in the embodiment shown in FIG. 2.

FIG. 3 shows an example of the randomized color filter array of the CCD image pickup device 4 to be used as the color image pickup device in the embodiment shown in FIG. 2. While the number of pixels of the CCD image pickup device 4 can be determined at will, it is here supposed as of the order of 1,000,000 pixels. FIG. 2 shows only the filter array corresponding to 8×8=64 pixels at a center portion. The following description will specifically explain the procedure for obtaining such randomized array. The illustrations in the figures are only to facilitate understanding and it is thought that an illustration of such region is sufficient for the understanding. Further, since the substance of the present invention consists in a randomized arrangement, it is meaningless and impossible to show an example of pattern of the entire region. The kind of filter in the present embodiment uses the so-called RGB, three primary colors, and the coding thereof is RGB random filter coding.

A description will now be given of an example of procedure for obtaining such random filter coding. Since this coding is a random coding, it is naturally possible to use a die by assigning two sides thereof to each of RGB in order to decide a color filter for each pixel. To reduce complexity thereof, however, a spread sheet software product or the like is used to prepare a table form corresponding to the entire pixel array. Here, "0→R, 1→G, 2→B" for example can be applied to the values obtained by allocating MOD(RND/3) to the respective cells of the array, where RND is a random number function of suitable figures and MOD(n/d) is a remainder function obtained by dividing n by d.

Statistically, thus obtained array usually does not possess a conspicuous bias. It is possible, however, though unlikely in probability, that one obtained by a single trial contains an extremely large variance in quantity of pixels by colors or a concentration of a specific color in a relatively large area. Also, though very unlikely, the possibility of resulting in a pattern having a cyclicity such as a conventional Bayer array cannot be denied. For this reason, it is preferable to obtain a plurality of sample arrays by performing several times of trails by the above described methods. One evaluated as favorable is then adopted by conducting imaging tests by actual picture taking (in practice suitably using a simulation). Characteristic bias of the above described types can be statistically removed without difficulty by trials of equal to or less than three to four times.

In the color image pickup apparatus (digital camera) using the CCD image pickup device 4 having such random color filter array, signals are read out and processed in a similar manner as the conventional cameras. The picked up image is recorded on the memory card 9 or displayed on the LCD image display system 10. The operation different from that of the convention is color separation processing (color signal generation processing). Such color separation processing is performed by the digital processing circuit 7 under the control of the system controller 11.

The color separation processing is fundamentally a signal supplementation using neighboring pixel information or the like for a pixel without a corresponding color signal (such as R filter pixel in the process of B signal generation) and is not at all different from the convention in this respect. In the conventional color separation processing, however, methodical sampling based on a sequence is executed corresponding to a regular color coding of the CCD image pickup device. Simple supplementations using a hold circuit or the like, and additions, subtractions, etc., among the pixels as required are then performed. The actual processing varies among analog processing, digital processing, hybrid processing, etc. By contrast, the random color coding to be used in the present invention has no regularity and hence cannot be subject to such processing. For this reason, the color separation processing is performed by looking up the filter coding data concerning the pixels of CCD image pickup device to be used, i.e., a filter table of all the pixels corresponding to FIG. 3. Such filter coding data is stored in the EEPROM 17 so that it can correspond to a case where the color coding of CCD image pickup device to be used is different.

The actual color separation processing (generation of each color signal) of the present embodiment is performed as follows. In particular, "the filter coding data is first looked up concerning the referred, subject pixel; signal level of the pixel is outputted without being changed as a signal for the color signal of the color of filter of the pixel itself; and, for the signal of other colors, the neighboring pixels are searched based on the filter coding data for the pixel of the nearest, corresponding color filter and the signal level of the applicable pixel is outputted without change as a signal of that color."

When the filter of the referred, subject pixel is of R, the color separation processing is for example as follows.

R signal: since the result of looking up the filter coding data is R, the signal level of the pixel is outputted as R signal without being changed.

G signal: since the result of looking up is R and not G, the neighboring pixels are searched for the nearest G pixel based on the filter coding data and the signal level of the applicable pixel is outputted as G signal.

B signal: since the result of looking up is not B likewise, the neighboring pixels are searched for the nearest B pixel based on the filter coding data and the signal level of the applicable pixel is outputted as B signal.

In the example of the above color separation processing, suppose for example that the pixels of (R, G, B, B) filters are disposed respectively at (above, below, left to, right to) the referred R filter pixel. While there are two "nearest B" pixels on the left and right sides, it is possible in such case either to use the signal level of only one of the two or to use the average of the signal levels of the two.

The color signals obtained as a result of color separation processing such as the above are processed as concurrent, RGB three primary-color signals with respect to all the pixels in a circuit at a later stage similarly as the conventional RGB three primary-color signals. Finally, they are recorded on the memory card 9 or displayed on the LCD image display system 10. It should be noted that such processing in the circuit at a later stage is per se known and for example includes: color balance processing; conversion to luminance—color difference signal by matrix operation or inversion processing thereof; false color elimination or reduction by band limitation or the like; various non-linear processing typically represented by γ-conversion; various information compression processing; etc.

The occurrence of false color in such processing will now be considered. For such objects as black-and-white knife edge or an isolated white point (line) or the like, false colors similar to that of the conventional color coding occur naturally due to the effect of the plane color coding. These however, are false color points or color lines all occurring in isolation. Since their main energy is distributed in a high-frequency region, they can be eliminated or sufficiently reduced by such techniques as a known electrical filtering. Further, in imaging of stripe-like repetitive pattern which has been the most serious problem in the conventional system, at least a false color (color moire) in lower region by folding to low frequency (an aliased low frequency) does not occur, since the coding is randomized. In the present embodiment, therefore, the occurrence of false color is limited to those in isolation which can be eliminated or be reduced as described above. Hence it is possible to obtain a high quality image almost free from false colors which cause a visual problem, despite the fact that the present embodiment does not use an optical low-pass filter which has been necessary in the conventional digital camera of this type.

While a description has been given with respect to the first embodiment, various modifications are possible of the above described embodiment. First, in the above described embodiment, the filter coding data is stored in the EEPROM 17 so that it can correspond to the case where the color filter coding of CCD image pickup device to be used is different. Since CCD image pickup devices in many cases require pixel defect data that differs from one unit to another due to variance in mass production, the use of EEPROM can be advantageous when used also as a memory for such purpose. On the other hand, since the image pickup devices applicable to one image pickup apparatus body are usually of one type and identical to each other except their variance due to mass production. Since change in the color filter coding is not specifically required, the same data can be used as the filter coding data for all. By noticing this point, the above described EEPROM can be replaced by a mask ROM. If replaced by mask ROM, construction costs can be lowered. Furthermore, in either case, it can naturally be used also as a program storage memory of the microcomputer of the system controller 11.

As also described at the beginning, the present invention intends to solve an essential problem inherent to image pickup device irrespective of its electrical construction (whether it comprises an image pickup tube or solid-state image, whether it is a CCD or other type, etc.) and/or the kind of color coding (whether it uses primary colors or complementary colors, whether it uses three colors or four colors, etc.). Hence it is applicable not only to the above embodiment but also to any one of the color image pickup devices including the above described types and to the image pickup apparatus using the same. For example, it can be used in a multi-sensor camera. It is applicable without modification such as to R/B sensor of G,R/B-type two-sensor color camera.

Further, "the procedure for obtaining random filter coding" has been shown merely as an example in the above embodiment and the random filter coding per se can be obtained by other suitable methods. In particular, an array is said to be a random color coding array of the present embodiment, if the pertinent color filter coding array is different from known regular arrays and is without a conspicuous, regular (cyclic) arrangement when a predetermined region of at least several to several tens of pixels of the array of photoelectric conversion elements is considered, thereby reducing occurrence of low-frequency false color for an input of stripe-like repetitive pattern which is caused by a conventional regular array.

A second embodiment of the invention will now be described. Since the fundamental construction of color image pickup apparatus (digital camera) according to the second embodiment is identical to that of the digital camera of the first embodiment shown in FIG. 2, it is incorporated herein by reference and an illustration thereof will be omitted.

The digital camera according to the second embodiment differs from the digital camera according to the first embodiment in that color filter having a randomized color coding array satisfying predetermined array restricting conditions is used as the color filter in the CCD color image pickup device 4.

In the first embodiment, one having a color coding array in the form of a simple random array is used as the color filter of the CCD image pickup device 4. As described above, one evaluated as favorable by imaging tests based on actual picture taking is adopted as such random color coding array, after obtaining a plurality of samples of array by performing several times of trials by using a spread sheet software product, random number function, remainder function, etc.

Such a trial method, in general, however, greatly reduces design efficiency and is not preferable if dependent on the trials alone from the start of designing, even though it is necessarily used in finally selecting an array. In another perspective, there should be some necessary conditions also in evaluating the arrays obtained by such trials, which are objective and must be met by the array itself to obtain a favorable imaging quality. (It is obvious that an extreme case where all the pixels are of the same color is not acceptable.) It is remarkably effective to specifically find out such conditions and to use these as the restricting conditions (criterion).

Figure 4:
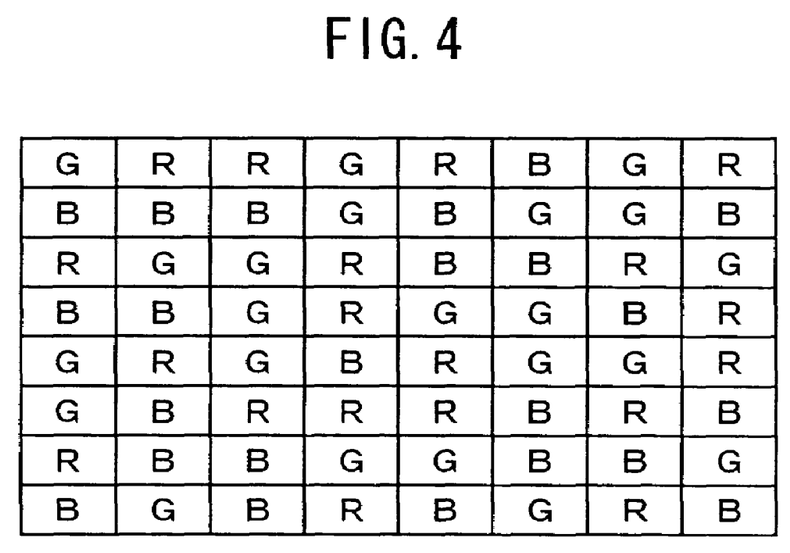
FIG. 4 shows an example of color filter of random color coding array satisfying predetermined array restricting conditions for CCD image pickup device in a second embodiment of the invention.

In the present embodiment, such restricting conditions are used in setting a random color coding array. In particular, the color image pickup device of the present embodiment uses the restricting conditions: "at least one pixel for each of R, G, B must be included in any one of arbitrarily selected 3×3 pixel regions." This prescribes a limit of sparseness in density (minimum density condition) of each specified color and hence secures a resolution of a predetermined value or greater for that color. FIG. 4 shows a color filter of random color coding array satisfying such restricting conditions.

It should be noted that an array satisfying such restricting conditions can be obtained either such that a large number of completely randomized arrays as used in the first embodiment are provided by trials and they are verified by the above conditions or such that restricting conditions are previously imposed on the generation process in generating an array for example by such software product as spread sheet.

In a color image pickup apparatus (digital camera) using the CCD image pickup device 4 having a random color filter array satisfying such restricting conditions, signals are read out and processed in a similar manner as in the camera of the first embodiment. The picked up image is recorded in the memory card 9 or displayed on the LCD image display system 10. The operation different from the convention is color separation processing. Such processing is performed by the digital processing circuit 7 under the control of the system controller 11. Since there is no regularity in the random coding which is applicable to the present embodiment, the color separation processing is performed by looking up the filter coding data (filter table of all the pixels corresponding to FIG. 4) in respect of each pixel of the CCD image pickup device to be used. Such coding data is stored in EEPROM 17 so that it can correspond to a case where the color coding of CCD image pickup device to be used is different.

The actual color separation processing (generation of each color signal) of the present embodiment is performed in a similar manner as the first embodiment. In particular, "the coding data is first looked up concerning the referred, subject pixel; signal level of the pixel is outputted without being changed as a signal for the color signal of the color of filter of the pixel itself; and, for the signal of other colors, the neighboring pixels are searched based on the coding data for the pixel of the nearest, corresponding color filter and the signal level of the applicable pixel is outputted without change as a signal of that color."

The color signals obtained as a result of color separation processing such as the above are subjected to various processing as concurrent, RGB three primary-color signals with respect to all the pixels in a circuit at a later stage similarly as the conventional RGB three primary-color signals. Finally, they are recorded on the memory card 9 or displayed on the LCD image display system 10.

The occurrence of false color in such process will now be considered. In imaging of stripe-like repetitive pattern which has been the most serious problem in the conventional system, at least a false color (color moire) in lower region by folding to low frequency (an aliased low frequency) does not occur, since the coding is randomized. In the present embodiment, similarly as in the first embodiment, the occurrence of false color is limited to those in isolation which can be eliminated or be reduced. Hence it is possible to obtain a high quality image almost free from false colors which cause a visual problem, despite the fact that the present embodiment does not use an optical low-pass filter which has been necessary in the conventional digital camera of this type.

In addition, since all of the three colors of R, G, B exist in an arbitrarily selected 3×3 pixel region in the present embodiment, the maximum value of blur of pixels, i.e., width of PSF (point spread function), is not greater than 5×5 pixels. Even if a local degradation in resolution occurs, it is possible to secure a color resolution of the order of ½ comparing to R and B in "the case of using an average value of neighboring pixels instead of one pixel in the supplementation at the time of color separation with a conventional Bayer array". Furthermore, this is a comparison based solely on the effect of pure pixel sampling. It is thus in effect possible to obtain a resolution somewhat higher than this, since there is no optical low-pass filter which causes a deterioration in response.

Various modifications are possible also of the present embodiment. First, setting of the region of the above described restricting conditions can be changed at will. For example, if a pixel region of 2×2 pixels is set, the width of PSF is 3×3 pixels at the maximum whereby the lower limit of local deterioration in resolution can be improved to the level of R and B in the above described conventional Bayer array. In such case, since a narrower restriction reduces the degree of freedom in constructing an array, it is thought that the effect of randomization is relatively lowered. There is a trade-off. Conversely, therefore, a loosening of restriction by using a region of 4×4 pixels or more is also a consideration. Further, the shape of a region can also be arbitrarily determined. If a rectangular region is used, a difference can be made in the limit of local resolution deterioration between horizontal and vertical directions. If a cross is used, it is possible to relatively inhibit deterioration in resolution along oblique directions.

Further, the above embodiment has been shown as that in which the coding data is stored in EEPROM 17 so that it can correspond to a case where the coding of CCD image pickup device to be used is different. In the present embodiment, too, the EEPROM can be replaced by a mask ROM. If replaced by mask ROM, construction costs can be lowered. Furthermore, in either case, it can naturally be used also as a program storage memory of the microcomputer of the system controller 11.

A third embodiment of the invention will now be described. Since the fundamental construction of color image pickup apparatus (digital camera) according to the third embodiment is also identical to that of the digital camera of the first embodiment shown in FIG. 2, it is incorporated herein by reference and an illustration thereof will be omitted.

The digital camera according to the third embodiment differs from the digital camera according to the first embodiment in that color filter having a randomized color coding array satisfying predetermined color distributing conditions is used as the color filter in the CCD color image pickup device 4.

In the first embodiment, one having a color coding array in the form of a simple random array is used as the color filter of the CCD image pickup device 4. As described above, one evaluated as favorable by imaging tests based on actual picture taking is adopted as such random color coding array, after obtaining a plurality of samples of array by performing several times of trials by using a spread sheet software product, random number function, remainder function, etc.

Such a trial method, in general, however, greatly reduces design efficiency and is not preferable. Further, there should be some necessary conditions also in evaluating the arrays obtained by such trials, which are objective and must be met by the array itself to obtain a favorable imaging quality. It is remarkably effective to specifically find out such conditions and to use these as the restricting conditions (criterion).

Figure 5:
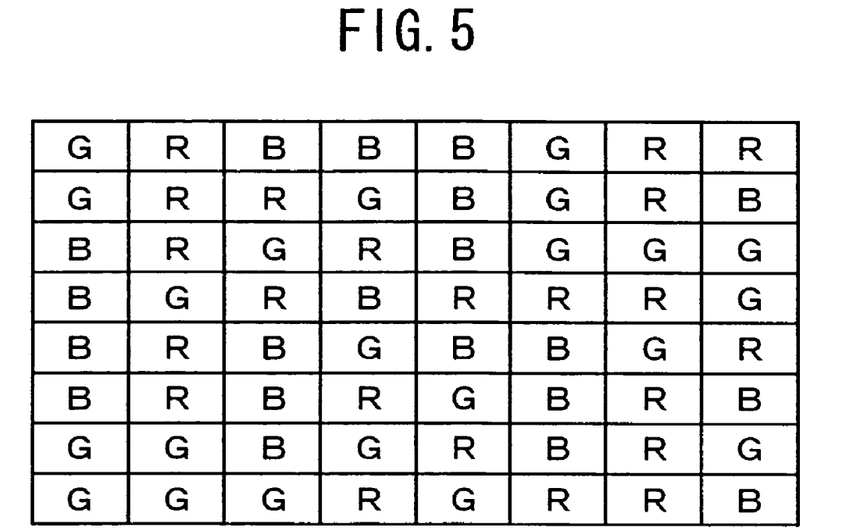
FIG. 5 shows an example of color filter of random color coding array satisfying predetermined color distributing conditions for CCD image pickup device in a third embodiment of the invention.

In the present embodiment, predetermined color distributing conditions are used in setting the random color coding array. In particular, the color image pickup device of the present embodiment uses as a restricting condition ①: "for the total effective pixel area, the pixel number ratios R/G, G/B, B/R each are substantially "1" (allowable range 0.89-1.12)". Although the ideal target value is "1", the exact value "1" cannot be achieved due to the essential (statistical) nature of a random array. Verification is made by setting an allowable range of values by which a substantially equivalent performance is expected. This prescribes a relative ratio of occurrence for each of the colors so as to secure a high average resolution for the signals. (It can also be said that this is set to the same ratio as the RGB ratio in the conventional stripe array.) Here the criterion in setting the allowable range is ±1.0 dB. (The criterion for allowable range is the same throughout the following unless otherwise specified.) FIG. 5 shows a filter of random color coding array satisfying such predetermined color distributing conditions.

The restricting condition ① concerns the total effective pixels and hence does not directly restrain (is not a necessary condition of) the exemplary array in FIG. 5 which shows a segment thereof. Actually, however, the 8×8 pixels illustrated in FIG. 5 satisfy the restricting condition ①, since the pixel number of each color is: R=22; G=22; and B=20. Accordingly, the exemplary array shown in FIG. 5 constitutes an embodiment of imaginary image pickup device having a small number of pixels or the total effective pixels of 64. At the same time, it typically represents one sufficient condition in a sense that, if each of all possible 8×8 regions in the total effective pixels satisfies for example the condition as shown in FIG. 5, the restricting condition ① is satisfied as a whole in an image pickup device having a large number of pixels as actually used in this embodiment.

It should be noted that an array satisfying such restricting conditions can be obtained either such that a large number of completely randomized arrays as used in the above first embodiment are provided by trials and they are verified by the above conditions or such that restricting conditions are previously imposed on the generation process in generating an array for example by such software product as spread sheet.

A modification will be shown below as one directly corresponding to an example generated by such technique as of the latter, where the target value of pixel number ratio of RGB is determined to be 1:2:1. In particular, an additionally higher average resolution can be obtained in respect of luminance signals by setting the same ratio as the RGB ratio in the conventional Bayer array so that a greater number of pixels are distributed to G which has a greater contribution to luminance signals. At this time, a similar spread sheet software product as the above can be used. A formula MOD(RND/4) is allocated to each cell of the array and it suffices to apply for example "0→R, 1→G 2→G, 3→B" to the obtained values. A random array having the aimed ratio can be obtained if the random numbers are not specifically biased.

Figure 6:
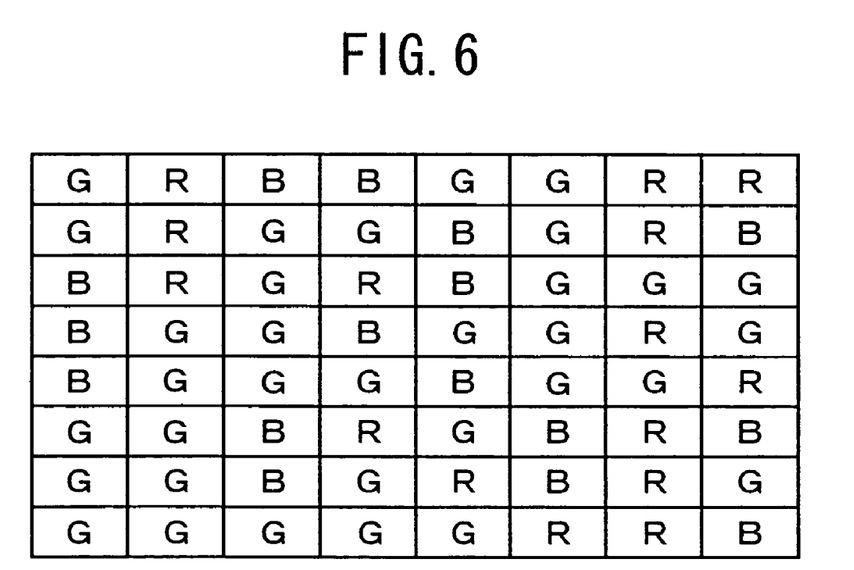
FIG. 6 shows a modification of color filter of random color coding array satisfying the color distributing conditions shown in FIG. 5.

Since, however, a statistical bias can occur also in this case in a similar manner as the above, verification is finally made by a restricting condition ②: "for the total effective pixel area, the pixel number ratios R/G, B/G each are substantially "0.5" (allowable range 0.45-0.56)", and one satisfying this is adopted. An exemplary array corresponding to this modification is shown in FIG. 6 which is similar in significance to FIG. 5 of the third embodiment. The pixel number of each color is R=15, G=33, and B=16 and hence a condition corresponding to the restricting condition ② is satisfied.

It should be pointed out here that such target value can be set to any desired value by the random array of the present embodiment, while the setting of pixel ratio in the case of cyclic array such as the conventional Bayer array can be set only to ratios obtained by distributing the number of pixels in a unit array to the respective colors. Actual examples of such ratio target value (R/G, B/G) for example include: ③ (0.7, 0.7); ④ (0.43, 0.43); ⑤ (0.15, 0.15); ⑥ (0.51, 0.19). The setting of ③ is a value between the above restricting conditions ① and ② and is an example of setting to an intermediate ratio between the conventional stripe and Bayer arrays. Color distribution of ④ corresponds to the color bandwidths of the standard NTSC television system (I=1.5 MHz, Q=0.5 MHz); and ⑤ corresponds to the color bandwidths of the narrow-band NTSC television system (B−Y=0.5 MHz, R−Y=0.5 MHz). (The result of subtracting the total of the respective color difference signal bandwidths from the luminance signal bandwidth 4.3 MHz is distributed to G and the total of the color difference signal bandwidths is divided equally to R and B.) Color distribution of ⑥ corresponds to the contributing ratio of RGB in generating luminance signal Y. It is in this manner possible to set also the ratio of R and B at will.

In a color image pickup apparatus (digital camera) using the CCD image pickup device 4 having a random color filter array satisfying such predetermined color distributing conditions, signals are read out and processed in a similar manner as in the camera of the first or second embodiment. The picked up image is recorded in the memory card 9 or displayed on the LCD image display system 10. The operation different from the convention is color separation processing. Such processing is performed by the digital processing circuit 7 under the control of the system controller 11. Since there is no regularity in the random coding which is applicable to the present embodiment, the color separation processing is performed by looking up the filter coding data (filter table of all the pixels corresponding to FIG. 5 or 6) in respect of each pixel of the CCD image pickup device to be used. Such coding data is stored in EEPROM 17 so that it can correspond to a case where the color coding of CCD image pickup device to be used is different.

The actual color separation processing (generation of each color signal) of the present embodiment is performed in a similar manner as the first or second embodiment. In particular, "the coding data is first looked up concerning the referred, subject pixel; signal level of the pixel is outputted without being changed as a signal for the color signal of the color of filter of the pixel itself; and, for the signal of other colors, the neighboring pixels are searched based on the coding data for the pixel of the nearest, corresponding color filter and the signal level of the applicable pixel is outputted without change as a signal of that color."

The color signals obtained as a result of color separation processing such as the above are subjected to various processing as concurrent, RGB three primary-color signals with respect to all the pixels in a circuit at a later stage similarly as the conventional RGB three primary-color signals. Finally, they are recorded on the memory card 9 or displayed on the LCD image display system 10.

The occurrence of false color in such process will now be considered. In imaging of stripe-like repetitive pattern which has been the most serious problem in the conventional system, at least a false color (color moire) in lower region by folding to low frequency (an aliased low frequency) does not occur, since the coding is randomized.

In the present embodiment, similarly as in the first or second embodiment, the occurrence of false color is limited to those in isolation which can be eliminated or be reduced. Hence it is possible to obtain a high quality image almost free from false colors which cause a visual problem, despite the fact that the present embodiment does not use an optical low-pass filter which has been necessary in the conventional digital camera of this type.

In addition, the present embodiment satisfies the above described color distributing conditions. In particular, an image is obtained with favorable color reproduction where the average resolutions of RGB are substantially equal to each other if the restricting condition ① in the above embodiment is satisfied; and an image is obtained with an average luminance resolution as high as that of Bayer array if the restricting condition ② in the above modification of the embodiment is satisfied. Furthermore, since, unlike the convention, no optical low-pass filter is used, the lowering of response due to this does not occur and the actually obtained resolution is additionally higher.

In addition, various other modifications are possible of the present embodiment. First, all of the color distribution restricting conditions of the above embodiment are to restrict only "the pixel number ratio of the total effective pixel area" and hence to secure average resolution of the imaging area as a whole. In such case, if distribution is biased, there remains the possibility of a local degradation in color resolution. Hence, a yet greater advantage can be obtained by introducing, in addition to the above restriction concerning the total effective pixel area, for example, a block restricting condition C(N,M) so that local resolutions can also be secured by imposing a restricting condition: "'pixel number ratio concerning optionally selected N×M pixel region (N,M: constants represented by integer) within the effective pixel region' is restricted to the same ratio conditions as in the above embodiment".

Here, since the number of pixels to be contained in such block is smaller if the values of N, M are relatively small, it is impossible in some cases to satisfy the pixel number setting of the allowable range such as the above as it is. Hence it is necessary to change the setting of the allowable range in accordance with the setting of the constants N, M. For example, since the pixel number in a block is 16 pixels in the case of C(4,4), only the case of 5.3 (allowable range 5.1-5.8) pixels for each of RGB is theoretically allowable in order to satisfy a target value corresponding to the above restricting condition ①. Naturally this cannot be satisfied. Hence the allowable condition of such local pixel number is loosened as compared to those concerning the entire area. For example, "5 pixels or 6 pixels" is applied.

Further, the above embodiment has been shown as that in which the coding data is stored in EEPROM 17 so that it can correspond to a case where the coding of CCD image pickup device to be used is different. In the present embodiment, too, the EEPROM can be replaced by a mask ROM. If replaced by mask ROM, construction costs can be lowered. Furthermore, in either case, it can naturally be used also as a program storage memory of the microcomputer of the system controller 11.

A fourth embodiment of the invention will now be described. Since the fundamental construction of color image pickup apparatus (digital camera) according to the fourth embodiment is also identical to that of the digital camera of the first embodiment shown in FIG. 2, it is incorporated herein by reference and an illustration thereof will be omitted.

In the digital camera according to the fourth embodiment, at the same time of making it possible to perform a high quality color imaging free from color moire even of an object having cyclic luminance change by using a color filter having random color coding array as the color filter of CCD image pickup device, pixel defect correction is performed based on pixel defect data at the time of color signal generation processing based on the color coding array data by storing to EEPROM array data concerning the random color coding array of the color filter and the pixel defect data.

The color filter to be used in the CCD image pickup device will first be described. A totally randomized array as shown in the first embodiment may be used as the color filter having the random color coding array. As described above, in such a case, one evaluated as favorable by imaging tests based on actual picture taking is adopted after obtaining a plurality of samples of array by performing several times of trials by using a spread sheet software product, random number function, remainder function, etc.

Such a trial method, in general, however, greatly reduces design efficiency and is not preferable. Further, there should be some necessary conditions also in evaluating the arrays obtained by such trials, which are objective and must be met by the array itself to obtain a favorable imaging quality. It is remarkably effective to specifically find out such conditions and to use these as the restricting conditions (criterion).

In the present embodiment, therefore, one satisfying such predetermined color coding array conditions is preferably used as the color filter. In particular, the CCD image pickup device in the present embodiment uses a color filter adopted under the restricting conditions that an arbitrarily selected pertinent pixel is in contact at one or more of its four sides with the two colors other than the filter color of the pertinent pixel (its own color) and is in contact with at one or more of its four sides or four corners the same color as the filter color of the pertinent pixel (its own color).

In particular, supposing that the filter of the pertinent pixel is R, the former condition of the color filter consist in the condition that at least one pixel each of G and B are contained in the four pixels with which it is in contact at its upper, lower, left and right sides. This condition secures that a supplementation based on nearest pixel information in the color separation processing to be described later is performed necessarily by using a contiguous pixel on upper, lower, left or right side thereof and hence to secure a high resolution equal to or above a certain value. Furthermore, according to the latter restricting condition, even if a pixel defect (supposedly isolated) occurs, since there is always the same color as the filter color of the pertinent pixel (own color) in the adjoining eight pixels in the up and down, left and right and oblique directions, deterioration of resolution is practically prevented by thus supplementing such pixel defect.

Figure 7:
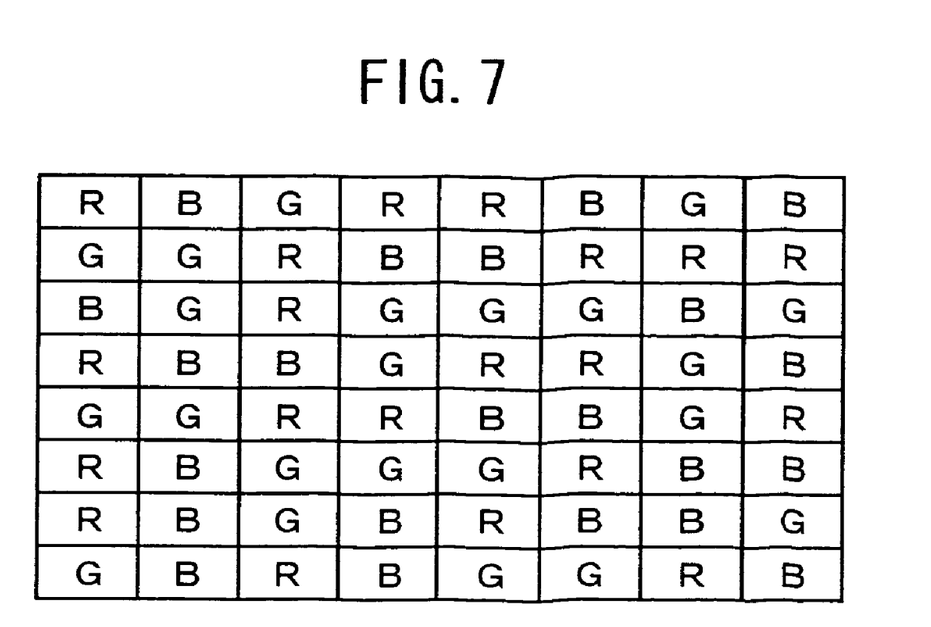
FIG. 7 shows an example of color filter of random color coding array satisfying predetermined color coding array conditions for CCD image pickup device in a fourth embodiment of the invention.

FIG. 7 shows a filter of random color coding array satisfying such predetermined color coding array conditions.

In the exemplary array shown in FIG. 7, while some of the pixels in each one of the outermost rows and columns apparently do not satisfy the above array restricting conditions, these do satisfy the conditions by the existence of pixels at further outside (not shown). Under the circumstances, the photoelectric conversion surface of the image pickup device is provided with a margin of one to several rows (columns) for each of the four sides from the effective image area to form the so-called "waste pixel region" (region participating in image signal generation but not included in the effective image area).

It should be noted that an array satisfying such restricting conditions can be obtained either such that a large number of completely randomized arrays as described above are provided by trials and they are verified by the above conditions or such that restricting conditions are previously imposed on the generation process in generating an array for example by such software product as spread sheet.

In a color image pickup apparatus (digital camera) using the CCD image pickup device 4 having a random color filter array satisfying such predetermined color coding array conditions, signals are read out and processed in a similar manner as in the camera of the first to third embodiments. The picked up image is recorded in the memory card 9 or displayed on the LCD image display system 10. The operation different from the convention is color separation processing. Such processing is performed by the digital processing circuit 7 under the control of the system controller 11. Since there is no regularity in the random coding which is applicable to the present embodiment, the color separation processing is performed by looking up the filter coding data (filter table of all the pixels corresponding to FIG. 7) in respect of each pixel of the CCD image pickup device to be used. Such coding data is stored in EEPROM 17 so that it can correspond to a case where the color coding of CCD image pickup device to be used is different.

Further, pixel defect data as to which ones of the pixels are fault pixels incapable of normally outputting information is also stored in EEPROM 17. Based on such pixel defect data, the pixel defect correction processing is performed at the same time of color separation in the digital processing circuit.

The actual color separation processing (generation of each color signal) including pixel defect correction processing of the present embodiment is performed as follows. In particular: "the pixel defect data is first looked up concerning the referred, subject pixel so as to determine whether it is a defect pixel or not; if not a fault pixel, the coding data is looked up and signal level of the pixel is outputted without being changed as a signal for the color signal of the filter color of the pixel itself; and, for the signal of other colors, the neighboring pixels are searched based on the filter coding data for the pixel of the nearest, corresponding color filter (excluding fault pixel) and the signal level of the applicable pixel is outputted without change as a signal of that color. If the subject pixel is a fault pixel, for all of the respective color signals, the neighboring pixels are searched based on the coding data for the pixel (excluding fault pixel) of the nearest, corresponding color filter, and the signal level of the applicable pixel is outputted as a signal of that color."

When the filter of the referred, subject pixel is of R, the color separation processing is for example as follows.

(1) If the subject R pixel to be referred to is not a fault pixel, outputs are provided as follows.

R signal: since the result of looking up the coding data is R, the signal level of the pixel is outputted as R signal without being changed.

G signal: since the result of looking up is not G, the neighboring pixels are searched for the nearest G pixel (excluding fault pixel) based on the coding data and the signal level of the applicable pixel is outputted as G signal.

B signal: since the result of looking up is not B, the neighboring pixels are searched for the nearest B pixel (excluding fault pixel) based on the coding data and the signal level of the applicable pixel is outputted as B signal.

(2) If the subject R pixel to be referred to is a fault pixel, outputs are provided as follows.

R signal: the neighboring pixels are searched based on the coding data for the nearest R pixel (excluding fault pixel) and the signal level of the applicable pixel is outputted as R signal.

G signal: the neighboring pixels are searched based on the coding data for the nearest G pixel (excluding fault pixel) and the signal level of the applicable pixel is outputted as G signal.

B signal: the neighboring pixels ate searched based on the coding data for the nearest B pixel (excluding fault pixel) and the signal level of the applicable pixel is outputted as B signal.

In the example of the above color separation processing, suppose for example that the pixels of (R, G, B, B) filters are disposed at (above, below, left to, right to) the referred R filter pixel. While there are two "nearest B" pixels on the left and right sides, it is possible in such case either to use only one of the two or to use the average of the two.

The color signals obtained as a result of color separation processing such as the above are subjected to various processing as concurrent, RGB three primary-color signals with respect to all the pixels in a circuit at a later stage similarly as the conventional RGB three primary-color signals. Finally, they are recorded on the memory card 9 or displayed on the LCD image display system 10.

The occurrence of false color in such process will now be considered. In imaging of stripe-like repetitive pattern which has been the most serious problem in the conventional system, at least a false color (color moire) in lower region by folding to low frequency (an aliased low frequency) does not occur, since the coding is randomized. In the present embodiment, similarly as in the first to third embodiments, the occurrence of false color is limited to those in isolation which can be eliminated or be reduced. Hence it is possible to obtain a high quality image almost free from false colors which cause a visual problem, despite the fact that the present embodiment does not use an optical low-pass filter which has been necessary in the conventional digital camera of this type.

In addition, since, in the present embodiment, supplementation based on nearest pixel information in the color separation processing is always performed by adjoining pixels at above, below, left or right, the maximum value of blur of pixels, i.e., the maximum value of width of PSF (point spread function) is not greater than 3 pixels. It is possible to secure a color resolution of about the same for G and of the order of 2 times for R, B comparing to "the case of a conventional Bayer array using an average value of neighboring pixels instead of one pixel in the supplementation at the time of color separation". Further, a supplementation in the case of an isolated pixel defect is considered. While a maximum of 5 pixels must be allowed as the width of PSF in the case of Bayer array, the maximum width of PSF in the present embodiment is unchanged from three pixels at least with respect to horizontal and vertical directions, since an isolated pixel defect can be supplemented by the referred pixel's color (own color) existing at one of the eight pixels which are adjoining thereto in the four directions of up and down, left and right and diagonals. (If supplementation of other colors in supplementing the referred pixel's color is considered, the maximum width is 7 pixels and 5 pixels, respectively.) Furthermore, this is a comparison based solely on the effect of pure pixel sampling. Since, in addition, this does not use any optical low-pass filter which causes a deterioration in response, the resolution can be extended into a frequency range where it has conventionally been impossible to resolve an image.

Various modifications are possible also of the present embodiment. First, the above embodiment has been shown as that in which the coding data and pixel defect data are stored in EEPROM 17 so that it can correspond to a case where the coding of CCD image pickup device to be used is different. Although this is a natural construction in view of using the memory for a double purpose, it is also possible that the EEPROMs serving as the storage means for storing the two types of data can be of separated bodies from each other. If only the coding data is considered at this time, since the image pickup devices applicable to one image pickup apparatus body are usually of one type and identical to each other (except their variance due to mass production). Since change in the color coding is not specifically required, the same data can be used as the coding data for all. By noticing this point, the above described EEPROM can be replaced for example by a mask ROM similarly as in the above described embodiments. If replaced by mask ROM, construction costs can be lowered. Furthermore, in either case, the memory serving as the means for storing these two types of data can naturally be used also as a program storage memory of the microcomputer of the system controller 11.

What claimed is:

1. A single sensor color image pickup apparatus for picking up a color image, comprising:
    a color image pickup device having a pixel group placed in an array of a plurality of pixels of photoelectric conversion elements and a color coding array corresponding to the pixel group, arranged in a randomized array and satisfying predetermined minimum color density conditions set for pixel number ratios between respective colors of color coding;
    the color coding array arranged in the randomized array directly picks up the color image;
    storage means for storing array data concerning the color coding array and pixel defect data of the color image pickup device; and
    color separation means for generating color signals in accordance with the color coding array data stored in the storage means, wherein said color separation means performing a predetermined pixel defect correction in the color signal generating process based on the pixel defect data stored in said storage means.

2. The single sensor color image pickup apparatus according to claim 1, wherein said color coding array comprises a color filter.

3. The single sensor color image pickup apparatus according to claim 1, wherein the predetermined pixel defect correction processing by said color separation means comprises processing where an output signal of a fault pixel is supplemented by using an output signal of the pixel nearest to the fault pixel among the pixels of the same color as the color of signal to be supplemented for the fault pixel.

4. The single sensor color image pickup apparatus according to claim 3, wherein said storage means comprises EEPROM.

5. The single sensor color image pickup apparatus according to claim 1, wherein said storage means comprises EEPROM.

* * * * *

UNITED STATES PATENT AND TRADEMARK OFFICE
CERTIFICATE OF CORRECTION

| | | |
|---|---|---|
| PATENT NO. | : 7,593,046 B2 | Page 1 of 1 |
| APPLICATION NO. | : 11/519823 | |
| DATED | : September 22, 2009 | |
| INVENTOR(S) | : Hideaki Yoshida | |

It is certified that error appears in the above-identified patent and that said Letters Patent is hereby corrected as shown below:

Title Page, Item (75) Inventors should read --Hideaki Yoshida, Hachioji (JP)--.

Signed and Sealed this

Twenty-third Day of November, 2010

David J. Kappos
*Director of the United States Patent and Trademark Office*

UNITED STATES PATENT AND TRADEMARK OFFICE
Certificate

Patent No. 7,593,046 B2                              Patented: September 22, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hideaki Yoshida, Hachioji (JP).

Signed and Sealed this Twenty-eighth day of December 2010.

JASON CHAN
*Supervisory Patent Examiner*
Art Unit 2622
Technology Center 2600